US012568249B2

(12) United States Patent
Wang

(10) Patent No.: US 12,568,249 B2
(45) Date of Patent: Mar. 3, 2026

(54) METHOD, APPARATUS, AND MEDIUM FOR VIDEO PROCESSING

(71) Applicant: Bytedance Inc., Los Angeles, CA (US)

(72) Inventor: Ye-Kui Wang, Los Angeles, CA (US)

(73) Assignee: BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/667,586

(22) Filed: May 17, 2024

(65) Prior Publication Data

US 2024/0305831 A1      Sep. 12, 2024

Related U.S. Application Data

(63) Continuation of application No. PCT/US2022/080063, filed on Nov. 17, 2022.

(60) Provisional application No. 63/281,381, filed on Nov. 19, 2021.

(51) Int. Cl.
*H04N 19/70*          (2014.01)
*H04N 19/172*         (2014.01)
*H04N 19/176*         (2014.01)

(52) U.S. Cl.
CPC ........... *H04N 19/70* (2014.11); *H04N 19/172* (2014.11); *H04N 19/176* (2014.11)

(58) Field of Classification Search
CPC ..................................................... H04N 19/70
See application file for complete search history.

(56) References Cited

U.S. PATENT DOCUMENTS

2005/0185937 A1*   8/2005   Comer ........... H04N 21/234327
                                                           386/334
2023/0026492 A1*   1/2023   Ikai ...................... H04N 19/184

FOREIGN PATENT DOCUMENTS

| EP | 3058747 B1 | 11/2019 |
| WO | 2020228762 A1 | 11/2020 |
| WO | 2021062014 A1 | 4/2021 |
| WO | 2021206524 A1 | 10/2021 |
| WO | 2021208896 A1 | 10/2021 |

OTHER PUBLICATIONS

International Search report in PCT/US2022/080063, mailed Feb. 3, 2023, 3 pages.
Bossen et al., "VVC operation range extensions (Draft 5)", Joint Video Experts Team (JVET) of ITU-T SG 16 WP 3 and ISO/IEC JTC 1/SC 29 24th Meeting, by teleconference, Oct. 6-15, 2021, JVET-X2005-v1, Oct. 2021, pp. 33 pages.

(Continued)

*Primary Examiner* — Jerry T Jean Baptiste
(74) *Attorney, Agent, or Firm* — Astute IP Law Group

(57)          ABSTRACT

Embodiments of the present disclosure provide a solution for video processing. A method for video processing is proposed. The method comprises: performing a conversion between a current video block of a video and a bitstream of the video based on general constraints information (GCI) for the video, the GCI comprising one or more syntax elements, wherein each of the one or more syntax elements is absent from the bitstream and has a value equal to a first predetermined value. Compared with the conventional solution, the proposed method can advantageously improve the coding efficiency.

20 Claims, 5 Drawing Sheets

300 ⌐

(56) References Cited

OTHER PUBLICATIONS

Ikai et al., "GCI flags for VVC operation range extension profiles", Joint Video Experts Team (JVET) of ITU-T SG 16 WP 3 and ISO/IEC JTC 1/SC 29 24th Meeting, by teleconference, Oct. 6-15, 2021, Document: JVET-X0076_v2, ITU, 0076, 5 pages.

Office Action for Japanese Patent Application No. 2024-529580, mailed on Jun. 24, 2025, 8 pages.

Extended European Search Report for European Patent Application No. 22896732.9, mailed on Aug. 28, 2025, 10 pages.

Lim et al., "AHG9: Modification of general constraints flags", ETRI, Joint Video Experts Team (JVET) of ITU-T SG 16 WP 3 and ISO/IEC JTC 1/SC 29/WG 11 18th Meeting: by teleconference, Apr. 15-24, 2020, Document JVET-R0086-v2, 4 pages.

Office Action for Japanese Patent Application No. 2024-529580, mailed on Oct. 21, 2025, 10 pages.

"Versatile video coding - Series H: Audiovisual and Multimedia Systems Infrastructure of audiovisual services—Coding of moving video", ITU-T Telecommunication standardization sector of ITU, International Telecommunication Union, H.266, Aug. 29, 2020, 513 pages.

Wang et al., "AHG2/AHG8: On the range extensions GCI flags", Bytedance Inc., Joint Video Experts Team (JVET) of ITU-T SG 16 WP 3 and 1S0/IEC JTC 1/SC 29 25th Meeting, by teleconference, Jan. 12-21, 2022, Document: JVET-Y0049-v1, 6 pages.

* cited by examiner

ENCODED BITSTREAM

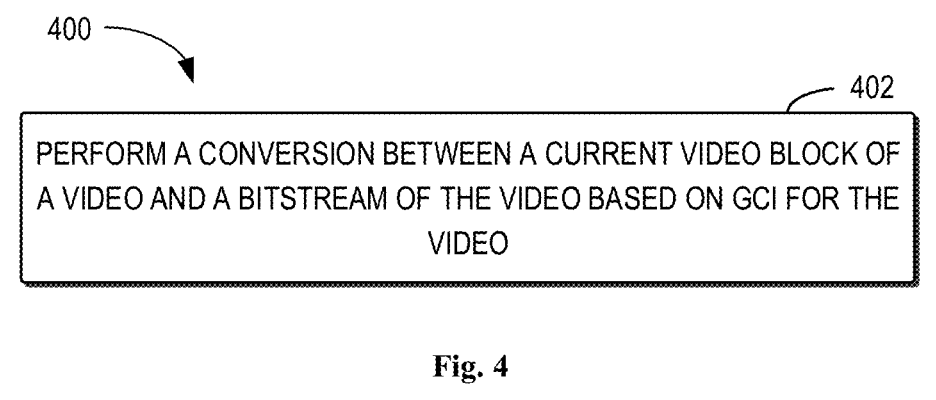

400

402

PERFORM A CONVERSION BETWEEN A CURRENT VIDEO BLOCK OF A VIDEO AND A BITSTREAM OF THE VIDEO BASED ON GCI FOR THE VIDEO

Fig. 4

METHOD, APPARATUS, AND MEDIUM FOR VIDEO PROCESSING

CROSS REFERENCE TO RELATED APPLICATIONS

This application is a continuation of International Application No. PCT/US2022/080063, filed on Nov. 17, 2022, which claims the benefit of the U.S. Provisional Application No. 63/281,381, filed on Nov. 19, 2021. The entire contents of these applications are hereby incorporated by reference in their entireties.

FIELD

Embodiments of the present disclosure relates generally to video coding techniques, and more particularly, to signaling of VVC range extensions general constraints information flags.

BACKGROUND

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by VCEG and MPEG jointly in 2015. Since then, many new methods have been adopted by JVET and put into the reference software named Joint Exploration Model (JEM). The JVET was later renamed to be the JVET when the VVC project officially started. VVC is the new coding standard, targeting at 50% bitrate reduction as compared to HEVC.

The VVC standard and the associated Versatile Supplemental Enhancement Information for coded video bitstreams (VSEI) standard have been designed for use in a maximally broad range of applications, including both the traditional uses such as television broadcast, video conferencing, or playback from storage media, and also newer and more advanced use cases such as adaptive bit rate streaming, video region extraction, composition and merging of content from multiple coded video bitstreams, multiview video, scalable layered coding, and viewport-adaptive 360° immersive media. The latest draft of an amendment for the VVC standard includes the specification of range extensions profiles, and other aspects.

SUMMARY

Embodiments of the present disclosure provide a solution for video processing.

In a first aspect, a method for video processing is proposed. The method comprises: performing a conversion between a current video block of a video and a bitstream of the video based on general constraints information (GCI) for the video, the GCI comprising one or more syntax elements from the following syntax elements: a first syntax element indicating whether all pictures in one or more output layer sets (OLSs) are recovery point pictures or intra random access point (IRAP) pictures, a second syntax element indicating whether, for all pictures in one or more OLSs, an extended dynamic range is used in scaling and transformation processes and for a binarization of syntax elements abs_remaining and dec_abs_level, a third syntax element indicating whether, for all pictures in one or more OLSs, a Rice parameter used for a syntax structure residual_ts_coding in a current slice is indicated in syntax structures slice_header referring to a sequence parameter set (SPS), a fourth syntax element indicating whether, for all pictures in one or more OLSs, an alternative Rice parameter derivation is used for the binarization of syntax elements abs_remaining and dec_abs_level, a fifth syntax element indicating whether, for all pictures in one or more OLSs, a Rice parameter derivation for the binarization of syntax elements abs_remaining and dec_abs_level is initialized at the start of each transform unit (TU) using statistics accumulated from previous TUs, or a sixth syntax element indicating whether, for all pictures in one or more OLSs, a syntax element sh_reverse_last_sig_coeff_flag is present in syntax structures slice_header referring to the SPS, wherein each of the one or more syntax elements is absent from the bitstream and has a value equal to a first predetermined value.

Based on the method in accordance with the first aspect of the present disclosure, the value of each of the six GCI syntax elements is inferred to be equal to a predetermined value (e.g., 0), if it is not present in the bitstream. Compared with the conventional solution where the values of such GCI syntax elements are not inferred, the proposed method can obtain the values of these GCI syntax elements when they are absent from the bitstream, and thus can advantageously ensure a uniform process for video processing and improve the coding efficiency.

In a second aspect, an apparatus for processing video data is proposed. The apparatus for processing video data comprises a processor and a non-transitory memory with instructions thereon. The instructions, upon execution by the processor, cause the processor to perform a method in accordance with the first aspect of the present disclosure.

In a third aspect, a non-transitory computer-readable storage medium is proposed. The non-transitory computer-readable storage medium stores instructions that cause a processor to perform a method in accordance with the first aspect of the present disclosure.

In a fourth aspect, another non-transitory computer-readable recording medium is proposed. The non-transitory computer-readable recording medium stores a bitstream of a video which is generated by a method performed by a video processing apparatus. The method comprises: performing a conversion between a current video block of a video and a bitstream of the video based on general constraints information (GCI) for the video, the GCI comprising one or more syntax elements from the following syntax elements: a first syntax element indicating whether all pictures in one or more output layer sets (OLSs) are recovery point pictures or intra random access point (IRAP) pictures, a second syntax element indicating whether, for all pictures in one or more OLSs, an extended dynamic range is used in scaling and transformation processes and for a binarization of syntax elements abs_remaining and dec_abs_level, a third syntax element indicating whether, for all pictures in one or more OLSs, a Rice parameter used for a syntax structure residual_ts_coding in a current slice is indicated in syntax structures slice_header referring to a sequence parameter set (SPS), a fourth syntax element indicating whether, for all pictures in one or more OLSs, an alternative Rice parameter derivation is used for the binarization of syntax elements abs_remaining and dec_abs_level, a fifth syntax element indicating whether, for all pictures in one or more OLSs, a Rice parameter derivation for the binarization of syntax elements abs_remaining and dec_abs_level is initialized at the start of each transform unit (TU) using statistics accumulated from previous TUs, or a sixth syntax element indicating whether, for all pictures in one or more OLSs, a syntax element sh_reverse_last_sig_coeff_flag is present in syntax structures slice_header referring to the SPS, wherein each of the one or more syntax elements is absent from the bitstream and has a value equal to a first predetermined value.

In a fifth aspect, a method for storing a bitstream of a video is proposed. The method comprises: performing a conversion between a current video block of a video and a bitstream of the video based on general constraints information (GCI) for the video, the GCI comprising one or more syntax elements from the following syntax elements: a first syntax element indicating whether all pictures in one or more output layer sets (OLSs) are recovery point pictures or intra random access point (IRAP) pictures, a second syntax element indicating whether, for all pictures in one or more OLSs, an extended dynamic range is used in scaling and transformation processes and for a binarization of syntax elements abs_remaining and dec_abs_level, a third syntax element indicating whether, for all pictures in one or more OLSs, a Rice parameter used for a syntax structure residual_ts_coding in a current slice is indicated in syntax structures slice_header referring to a sequence parameter set (SPS), a fourth syntax element indicating whether, for all pictures in one or more OLSs, an alternative Rice parameter derivation is used for the binarization of syntax elements abs_remaining and dec_abs_level, a fifth syntax element indicating whether, for all pictures in one or more OLSs, a Rice parameter derivation for the binarization of syntax elements abs_remaining and dec_abs_level is initialized at the start of each transform unit (TU) using statistics accumulated from previous TUs, or a sixth syntax element indicating whether, for all pictures in one or more OLSs, a syntax element sh_reverse_last_sig_coeff_flag is present in syntax structures slice_header referring to the SPS; and storing the bitstream in a non-transitory computer-readable recording medium, wherein each of the one or more syntax elements is absent from the bitstream and has a value equal to a first predetermined value.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

FIG. 4 illustrates a flowchart of a method for video processing in accordance with some embodiments of the present disclosure.

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
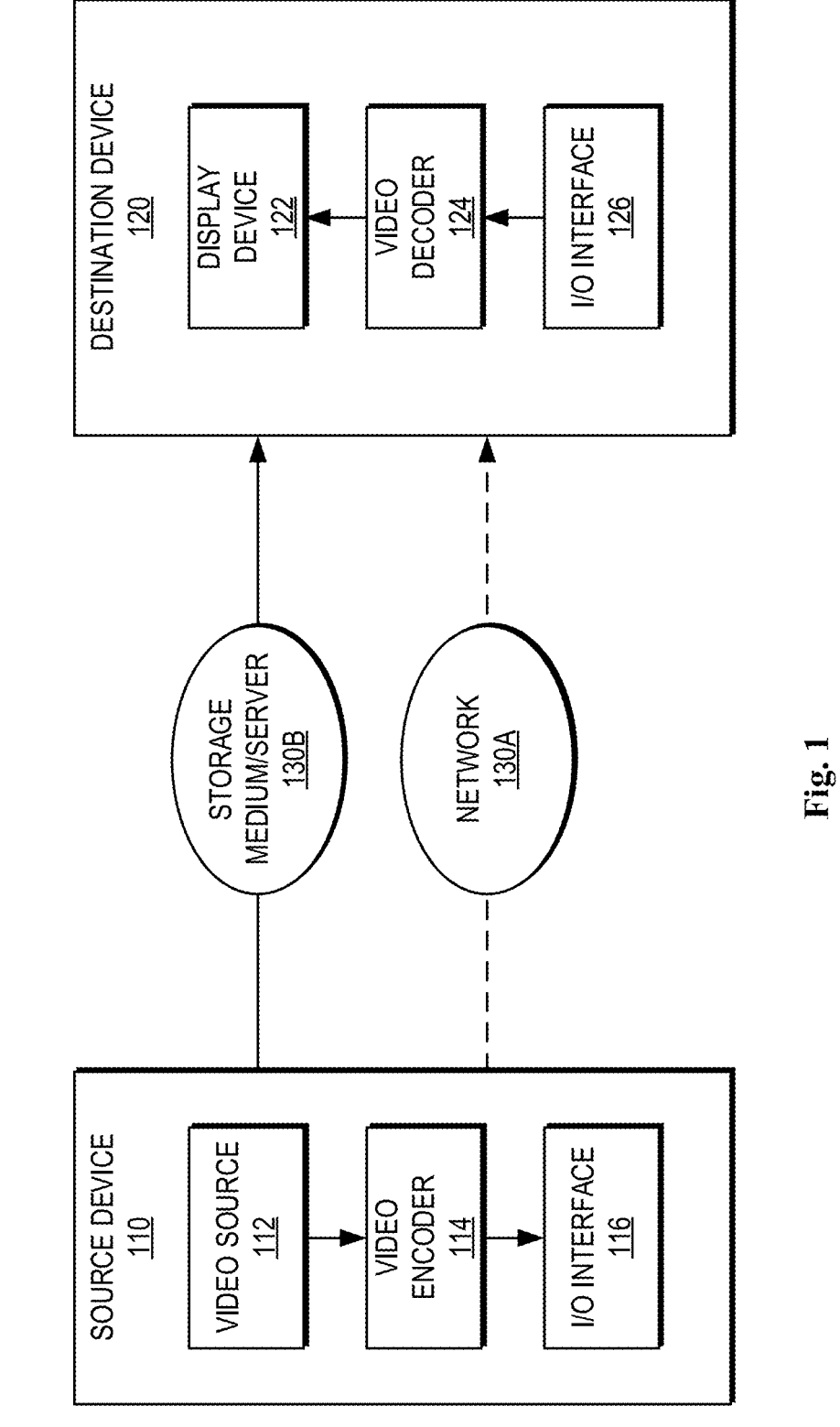
FIG. 1 illustrates a block diagram that illustrates an example video coding system, in accordance with some embodiments of the present disclosure.

FIG. 1 is a block diagram that illustrates an example video coding system 100 that may utilize the techniques of this disclosure. As shown, the video coding system 100 may include a source device 110 and a destination device 120. The source device 110 can be also referred to as a video encoding device, and the destination device 120 can be also referred to as a video decoding device. In operation, the source device 110 can be configured to generate encoded video data and the destination device 120 can be configured to decode the encoded video data generated by the source device 110. The source device 110 may include a video source 112, a video encoder 114, and an input/output (I/O) interface 116.

The video source 112 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded video data may be transmitted directly to destination device 120 via the I/O interface 116 through the network 130A. The encoded video data may also be stored onto a storage medium/server 130B for access by destination device 120.

The destination device 120 may include an I/O interface 126, a video decoder 124, and a display device 122. The I/O interface 126 may include a receiver and/or a modem. The I/O interface 126 may acquire encoded video data from the source device 110 or the storage medium/server 130B. The video decoder 124 may decode the encoded video data. The display device 122 may display the decoded video data to a user. The display device 122 may be integrated with the destination device 120, or may be external to the destination device 120 which is configured to interface with an external display device.

The video encoder 114 and the video decoder 124 may operate according to a video compression standard, such as the High Efficiency Video Coding (HEVC) standard, Versatile Video Coding (VVC) standard and other current and/or further standards.

Figure 2:
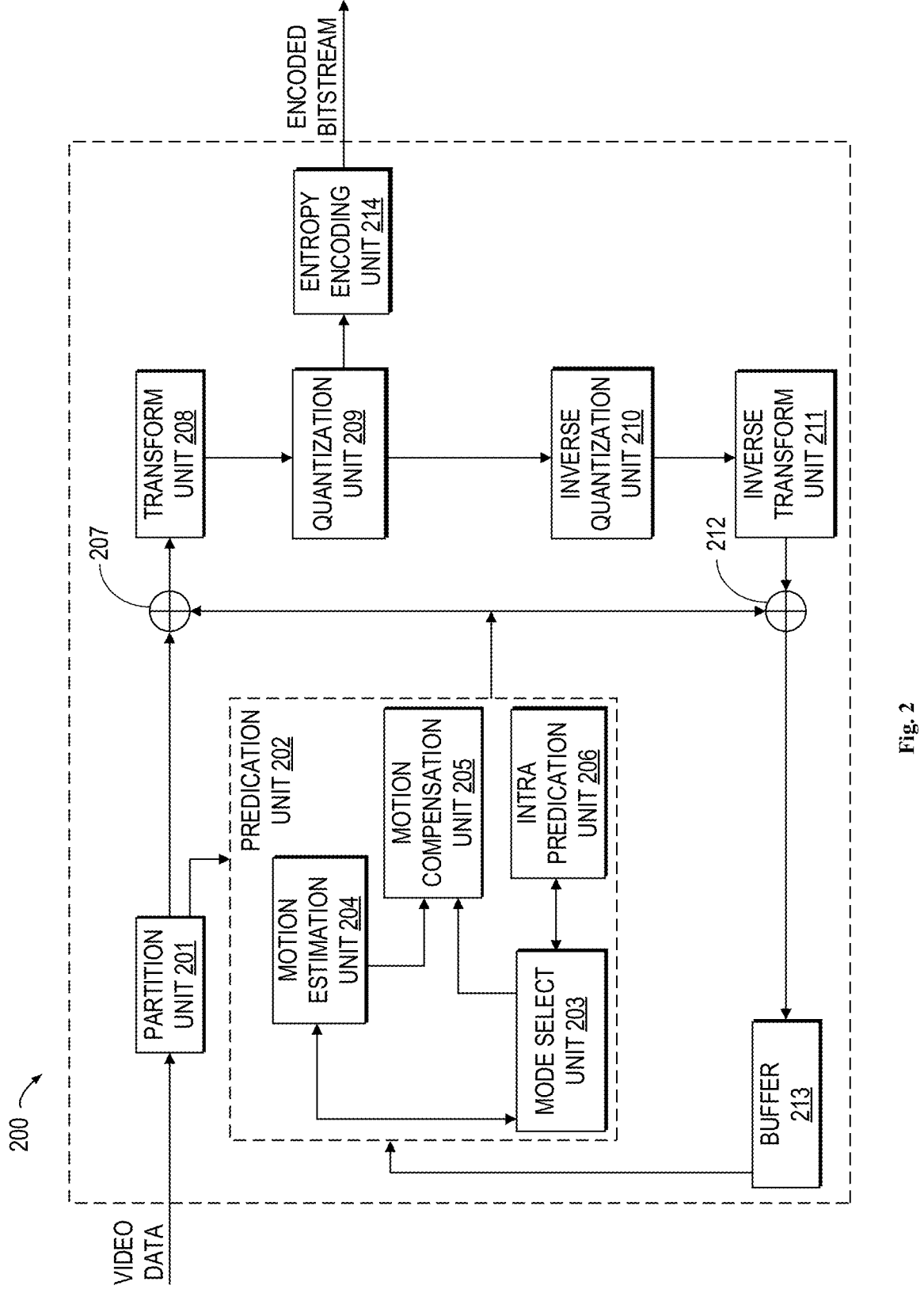
FIG. 2 illustrates a block diagram that illustrates a first example video encoder, in accordance with some embodiments of the present disclosure.

FIG. 2 is a block diagram illustrating an example of a video encoder 200, which may be an example of the video encoder 114 in the system 100 illustrated in FIG. 1, in accordance with some embodiments of the present disclosure.

The video encoder 200 may be configured to implement any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

In some embodiments, the video encoder 200 may include a partition unit 201, a predication unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the predication unit 202 may include an intra block copy (IBC) unit. The IBC unit may perform predication in an IBC mode in which at least one reference picture is a picture where the current video block is located.

Furthermore, although some components, such as the motion estimation unit 204 and the motion compensation unit 205, may be integrated, but are represented in the example of FIG. 2 separately for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra-coded or inter-coded block to a residual generation unit 207 to generate residual block data and to a reconstruction unit 212 to reconstruct the encoded block for use as a reference picture. In some examples, the mode select unit 203 may select a combination of intra and inter predication (CIIP) mode in which the predication is based on an inter predication signal and an intra predication signal. The mode select unit 203 may also select a resolution for a motion vector (e.g., a sub-pixel or integer pixel precision) for the block in the case of inter-predication.

To perform inter prediction on a current video block, the motion estimation unit 204 may generate motion information for the current video block by comparing one or more reference frames from buffer 213 to the current video block. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current video block based on the reference video block indicated by the motion information of the current video block.

Alternatively, in other examples, the motion estimation unit 204 may perform bi-directional prediction for the current video block. The motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder. Alternatively, in some embodiments, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the another video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

The intra prediction unit 206 may perform intra prediction on the current video block. When the intra prediction unit 206 performs intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block (s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform processing unit 208 may generate one or more transform coefficient video blocks for the current video block by applying one or more transforms to a residual video block associated with the current video block.

After the transform processing unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the predication unit 202 to produce a reconstructed video block associated with the current video block for storage in the buffer 213.

After the reconstruction unit 212 reconstructs the video block, loop filtering operation may be performed to reduce video blocking artifacts in the video block.

The entropy encoding unit 214 may receive data from other functional components of the video encoder 200. When the entropy encoding unit 214 receives the data, the entropy encoding unit 214 may perform one or more entropy encoding operations to generate entropy encoded data and output a bitstream that includes the entropy encoded data.

Figure 3:
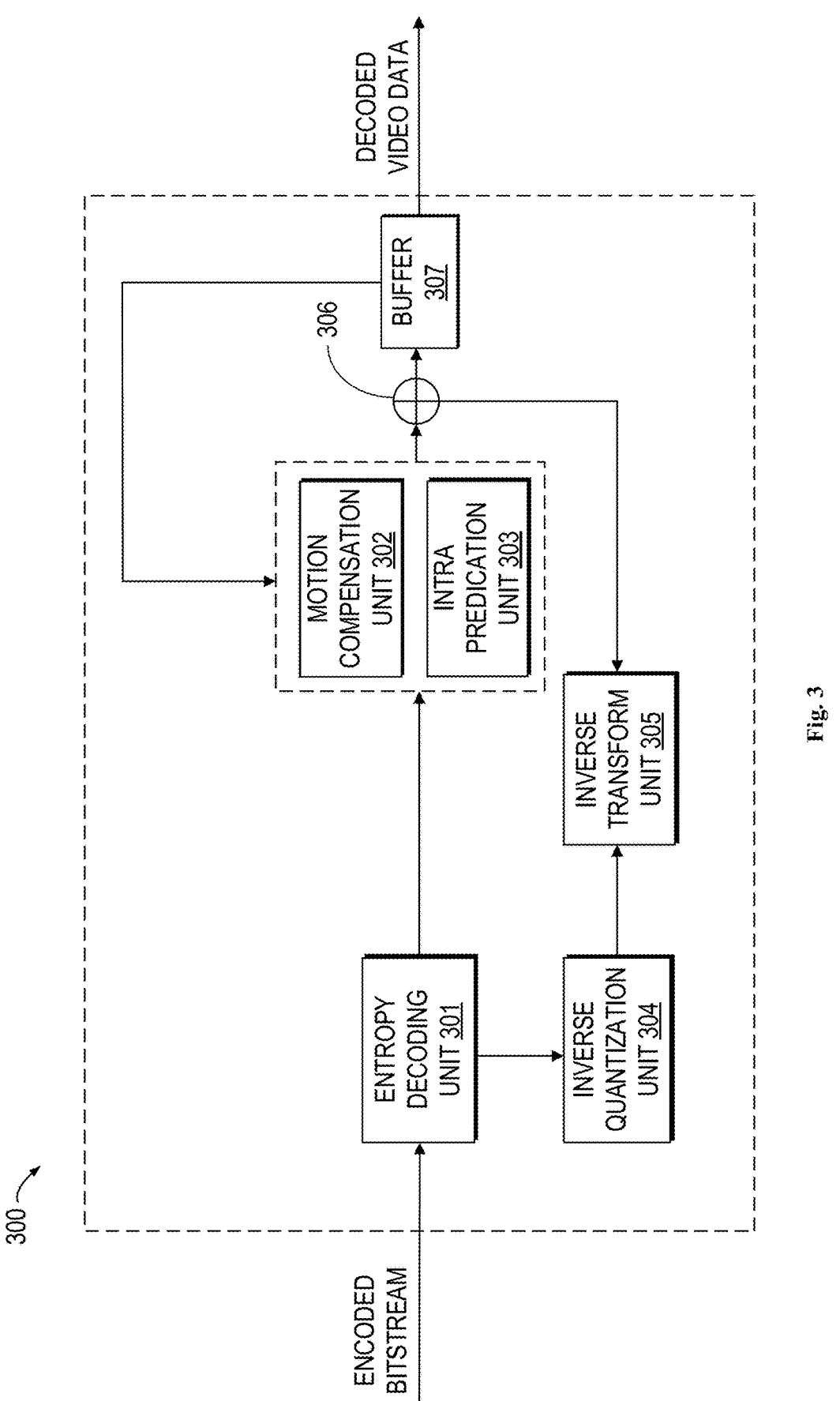
FIG. 3 illustrates a block diagram that illustrates an example video decoder, in accordance with some embodiments of the present disclosure.

FIG. 3 is a block diagram illustrating an example of a video decoder 300, which may be an example of the video decoder 124 in the system 100 illustrated in FIG. 1, in accordance with some embodiments of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transformation unit 305, and a reconstruction unit 306 and a buffer 307. The video decoder 300 may, in some examples, perform a decoding pass generally reciprocal to the encoding pass described with respect to video encoder 200.

The entropy decoding unit 301 may retrieve an encoded bitstream. The encoded bitstream may include entropy coded video data (e.g., encoded blocks of video data). The entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use the interpolation filters as used by the video encoder 200 during encoding of the video block to calculate interpolated values for sub-integer pixels of a reference block. The motion compensation unit 302 may determine the interpolation filters used by the video encoder 200 according to the received syntax information and use the interpolation filters to produce predictive blocks.

The motion compensation unit 302 may use at least part of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes for example received in the bitstream to form a prediction block from spatially adjacent blocks. The inverse quantization unit 304 inverse quantizes, i.e., de-quantizes, the quantized video block coefficients provided in the bitstream and decoded by entropy decoding unit 301. The inverse transform unit 305 applies an inverse transform.

The reconstruction unit 306 may obtain the decoded blocks, e.g., by summing the residual blocks with the corresponding prediction blocks generated by the motion compensation unit 302 or intra-prediction unit 303. If desired, a deblocking filter may also be applied to filter the decoded blocks in order to remove blockiness artifacts. The decoded video blocks are then stored in the buffer 307, which provides reference blocks for subsequent motion compensation/intra predication and also produces decoded video for presentation on a display device.

Some exemplary embodiments of the present disclosure will be described in detailed hereinafter. It should be understood that section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. SUMMARY

This disclosure is related to image/video coding technologies. Specifically, it is related to signalling of versatile video coding (VVC) range extensions general constraints information (GCI) flags. The ideas may be applied individually or in various combinations, for video bitstreams coded by any video codec, e.g., the VVC standard.

2. BACKGROUND 2.1. Video Coding Standards

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/ HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by VCEG and MPEG jointly in 2015. Since then, many new methods have been adopted by JVET and put into the reference software named Joint Exploration Model (JEM). The JVET was later renamed to be the Joint Video Experts Team (JVET) when the Versatile Video Coding (VVC) project officially started. VVC is the new coding standard, targeting at 50% bitrate reduction as compared to HEVC, that has been finalized by the JVET at its 19th meeting ended on Jul. 1, 2020.

The Versatile Video Coding (VVC) standard (ITU-T H.266|ISO/IEC 23090-3) and the associated Versatile Supplemental Enhancement Information for coded video bitstreams (VSEI) standard (ITU-T H.274|ISO/IEC 23002-7) have been designed for use in a maximally broad range of applications, including both the traditional uses such as television broadcast, video conferencing, or playback from storage media, and also newer and more advanced use cases such as adaptive bit rate streaming, video region extraction, composition and merging of content from multiple coded video bitstreams, multiview video, scalable layered coding, and viewport-adaptive 360° immersive media.

The Essential Video Coding (EVC) standard (ISO/IEC 23094-1) is another video coding standard that has recently been developed by MPEG.

The latest draft of an amendment for the VVC standard includes the specification of range extensions and a few other aspects.

2.2. Profile, Tier, Level (PTL) and Sub-Profile in VVC

VVC v1 defines six profiles, as described in Table 1. These profiles were each defined to address a broad range of applications, and they have logical "nesting" relationships to each other.

In Table 1, the term "4:2:0" refers to video with chroma color planes that have half the width and half the height of the luma plane, which is the most common format used for encoding camera-captured content in consumer applications. "4:4:4" refers to using chroma color planes that have the same width and the same height as the luma plane, as commonly used for graphics, display monitors and computer desktop rendering. "4:2:2" is a less common format with chroma that has half the width of the luma but the same height, e.g., as has often been used in studios for interlace-captured video. Monochrome video has only a single color plane, which is referred to as the luma plane (although it may not actually represent a luma signal—for example, a monochrome picture may represent a depth map for 3D video applications or a transparency map for the overlay of decoded video on a background).

Note that a decoder that conforms to a still picture profile shall be capable of decoding the first picture of a typical video profile bitstream, since the first picture of a bitstream is ordinarily an intra-coded picture. Such a decoder could also decode other IRAP pictures that are extracted as snapshots from video bitstreams. Having this subset relationship between the video and still picture profiles provides the ability to share encoder and decoder modules for use in different applications (and there has been a converging trend to the point where most newer video cameras can also be used for still-image photography and vice versa).

TABLE 1

The six profiles defined in VVC v1

| Profile name | Remarks |
|---|---|
| Main 10 | Monochrome and 4:2:0 chroma sampling only<br>8 to 10 bits bit depth<br>The bitstream has only one layer |
| Main 10 Still Picture | Same as Main 10 profile but the bitstream contains only a single picture (no inter-picture prediction) |
| Main 10 4:4:4 | Same as Main 10 profile but additionally supports 4:2:2 and 4:4:4 chroma sampling and the palette and adaptive color transform coding tools |
| Main 10 4:4:4 Still Picture | Same as Main 10 4:4:4 profile but the bitstream contains only a single picture (no inter-picture prediction) |
| Multilayer Main 10 | Same as Main 10 profile but the bitstream can have more than one layer |
| Multilayer Main 10 4:4:4 | Same as Main 10 4:4:4 profile but the bitstream can have more than one layer |

The PTL information is signaled using a syntax structure that can be included in the VPS (in which case, the PTL structure applies to one or more OLSs) or the SPS (in which case, the PTL structure applies to the OLS that contains only the layer referring to that SPS). This includes a PTL to which the bitstream conforms, as well as additional PTLs for the temporal sublayer representations, each of which is a self-contained subset of the bitstream.

In addition to the profiles defined in the VVC specification as shown in Table 1, VVC also allows the encoder to signal bitstream conformance to sub-profiles. A sub-profile is an interoperability subset indicator, similar to a profile, that imposes further restrictions on an existing indicated profile. Such sub-profiles would be defined outside the VVC specification and indicated using an identifier code that is registered as specified by Rec. ITU-T T.35 in order to avoid having multiple defined meanings for the same sub-profile code value. External organizations may define their own sub-profiles which they believe are sufficient to fulfill the needs of their specific applications. The sub-profile indicator syntax element within the PTL structure enables signaling within a bitstream that the bitstream conforms to such externally defined restrictions.

2.3. VVC General Constraints Information (GCI)

In VVC, in addition to the profile, tier, and level (PTL) information, the PTL syntax structure may also optionally include a general constraints information (GCI) syntax structure, which contains a list of constraint flags and non-flag syntax elements indicating specific constraint properties of the bitstream. When present, a GCI syntax element value greater than 0 indicates that the bitstream is constrained in a particular way, typically to indicate that a particular coding tool is not used in the bitstream, whereas the value 0 signals that the associated constraint may not apply, such that the associated coding tool is allowed (but not required) to be used in the bitstream (if its use is supported in the indicated profile).

The GCI structure contains several types of constraint syntax elements, including:

Flags for general bitstream restrictions, such as indicating that only intra coding is being used, that all layers are coded independently or that the bitstream contains only one AU;

Fields constraining the bit depth and chroma format of the coded pictures;

Flags indicating that certain NAL unit types are not allowed to be present within the bitstream;

Flags constraining the ways that the pictures can be partitioned into slices, tiles, and subpictures within the bitstream;

Flags constraining the size of CTUs, as well as the size and type of partitioning trees;

Flags constraining the use of particular intra coding tools;

Flags constraining the use of particular inter coding tools;

Flags constraining the transform, quantization, and residual coding tools; and

Flags constraining aspects of in-loop filters.

The purpose of the GCI syntax structure is to enable the simple discovery of configuration information about the features needed for decoding the bitstream and to allow the signaling of interoperability points which impose restrictions beyond those specified by the PTL, with a finer granularity than allowed by previous video coding standards. Similar to sub-profiles, use of the GCI syntax structure could allow interoperability to be defined for decoder implementations that do not support all features of a VVC profile but address the needs of particular applications. Decoder implementations may examine the GCI syntax elements to check if a bitstream avoids the use of particular features, in order to determine how to configure the decoding process and identify whether the bitstream is decodable by the decoder. Decoder implementations that support all features of a VVC profile can ignore the GCI syntax element values, as such decoders will be capable of decoding any bitstream conforming to the indicated PTL.

Unlike the sub-profile indicator whose semantics are defined externally to the VVC specification, the semantics of the GCI syntax elements are defined within the VVC specification. Sub-profiles can also be used in combination with the GCI, with a sub-profile imposing constraints on the values of the GCI syntax elements. The use of the GCI, either together with a sub-profile indicator or instead of it, can avoid the possibility that the meaning of the sub-profile indicator might be unrecognized by a decoder (as there is no requirement that the meaning of a sub-profile indicator needs to be published). The syntax of the GCI syntax structure is as follows:

| | Descriptor |
|---|---|
| general_constraints_info( ) { | |
|   gci_present_flag | u(1) |
|   if( gci_present_flag ) { | |
|   /* general */ | |
|     gci_intra_only_constraint_flag | u(1) |
|     gci_all_layers_independent_constraint_flag | u(1) |
|     gci_one_au_only_constraint_flag | u(1) |
|   /* picture format */ | |
|     gci_sixteen_minus_max_bitdepth_constraint_idc | u(4) |
|     gci_three_minus_max_chroma_format_constraint_idc | u(2) |
|   /* NAL unit type related */ | |
|     gci_no_mixed_nalu_types_in_pic_constraint_flag | u(1) |
|     gci_no_trail_constraint_flag | u(1) |
|     gci_no_stsa_constraint_flag | u(1) |
|     gci_no_rasl_constraint_flag | u(1) |
|     gci_no_radl_constraint_flag | u(1) |
|     gci_no_idr_constraint_flag | u(1) |
|     gci_no_cra_constraint_flag | u(1) |
|     gci_no_gdr_constraint_flag | u(1) |
|     gci_no_aps_constraint_flag | u(1) |
|     gci_no_idr_rpl_constraint_flag | u(1) |
|   /* tile, slice, subpicture partitioning */ | |
|     gci_one_tile_per_pic_constraint_flag | u(1) |

-continued

| | Descriptor |
|---|---|
| gci_pic_header_in_slice_header_constraint_flag | u(1) |
| gci_one_slice_per_pic_constraint_flag | u(1) |
| gci_no_rectangular_slice_constraint_flag | u(1) |
| gci_one_slice_per_subpic_constraint_flag | u(1) |
| gci_no_subpic_info_constraint_flag | u(1) |
| /* CTU and block partitioning */ | |
| gci_three_minus_max_log2_ctu_size_constraint_idc | u(2) |
| gci_no_partition_constraints_override_constraint_flag | u(1) |
| gci_no_mtt_constraint_flag | u(1) |
| gci_no_qtbtt_dual_tree_intra_constraint_flag | u(1) |
| /* intra */ | |
| gci_no_palette_constraint_flag | u(1) |
| gci_no_ibc_constraint_flag | u(1) |
| gci_no_isp_constraint_flag | u(1) |
| gci_no_mrl_constraint_flag | u(1) |
| gci_no_mip_constraint_flag | u(1) |
| gci_no_cclm_constraint_flag | u(1) |
| /* inter */ | |
| gci_no_ref_pic_resampling_constraint_flag | u(1) |
| gci_no_res_change_in_clvs_constraint_flag | u(1) |
| gci_no_weighted_prediction_constraint_flag | u(1) |
| gci_no_ref_wraparound_constraint_flag | u(1) |
| gci_no_temporal_mvp_constraint_flag | u(1) |
| gci_no_sbtmvp_constraint_flag | u(1) |
| gci_no_amvr_constraint_flag | u(1) |
| gci_no_bdof_constraint_flag | u(1) |
| gci_no_smvd_constraint_flag | u(1) |
| gci_no_dmvr_constraint_flag | u(1) |
| gci_no_mmvd_constraint_flag | u(1) |
| gci_no_affine_motion_constraint_flag | u(1) |
| gci_no_prof_constraint_flag | u(1) |
| gci_no_bcw_constraint_flag | u(1) |
| gci_no_ciip_constraint_flag | u(1) |
| gci_no_gpm_constraint_flag | u(1) |
| /* transform, quantization, residual */ | |
| gci_no_luma_transform_size_64_constraint_flag | u(1) |
| gci_no_transform_skip_constraint_flag | u(1) |
| gci_no_bdpcm_constraint_flag | u(1) |
| gci_no_mts_constraint_flag | u(1) |
| gci_no_lfnst_constraint_flag | u(1) |
| gci_no_joint_cbcr_constraint_flag | u(1) |
| gci_no_sbt_constraint_flag | u(1) |
| gci_no_act_constraint_flag | u(1) |
| gci_no_explicit_scaling_list_constraint_flag | u(1) |
| gci_no_dep_quant_constraint_flag | u(1) |
| gci_no_sign_data_hiding_constraint_flag | u(1) |
| gci_no_cu_qp_delta_constraint_flag | u(1) |
| gci_no_chroma_qp_offset_constraint_flag | u(1) |
| /* loop filter */ | |
| gci_no_sao_constraint_flag | u(1) |
| gci_no_alf_constraint_flag | u(1) |
| gci_no_ccalf_constraint_flag | u(1) |
| gci_no_lmcs_constraint_flag | u(1) |
| gci_no_ladf_constraint_flag | u(1) |
| gci_no_virtual_boundaries_constraint_flag | u(1) |

-continued

| | Descriptor |
|---|---|
| gci_num_reserved_bits | u(8) |
| for( i = 0; i < gci_num_reserved_bits; i++ ) | |
| gci_reserved_zero_bit[ i ] | u(1) |
| } | |
| while( !byte_aligned( ) ) | |
| gci_alignment_zero_bit | f(1) |
| } | |

In the syntax of the GCI syntax structure, the first syntax element is the gci_present_flag that gates the presence of all GCI syntax elements as well as the bits reserved for future GCI syntax elements.

For simplicity, all syntax elements in the GCI syntax strucutre, excluding gci_present_flag, gci_num_reserved_bits, gci_reserved_zero_bit[i], and gci_alignment_zero_bit, are referred to as the GCI syntax elements.

The semantics of some of the GCI syntax structure is as follows:

gci_present_flag equal to 1 specifies that GCI syntax elements are present in the general_constraints_info( ) syntax structure. gci_present_flag equal to 0 specifies that GCI fields are not present in the general_constraints_info( ) syntax structure.

The semantics of the GCI syntax elements specified in this clause apply when gci_present_flag is equal to 1. When gci_present_flag is equal to 0, the general_constraint_info( ) syntax structure does not impose any constraint.

gci_intra_only_constraint_flag equal to 1 specifies that sh_slice_type for all slices in OlsInScope shall be equal to 2. gci_intra_only_constraint_flag equal to 0 does not impose such a constraint.

. . .

2.4. General Constraints Information (GCI) Flags in VVC Range Extensions

The following six new GCI flags have been added during the development of the VVC range extensions:

1) gci_all_rap_pictures_constraint_flag 2) gci_no_extended_precision_processing_constraint_flag 3) gci_no_ts_residual_coding_rice_constraint_flag 4) gci_no_rrc_rice_extension_constraint_flag 5) gci_no_persistent_rice_adaptation_constraint_flag 6) gci_no_reverse_last_sig_coeff_constraint_flag The changed syntax of the GCI syntax structure for inclusion of these new range extensions GCI flags is as follows (additions are underlined, and deleted parts are shown in strike through):

| | Descriptor |
|---|---|
| general_constraints_info( ) { | |
| gci_present_flag | u(1) |
| if( gci_present_flag ) { | |
| /* general */ | |
| gci_intra_only_constraint_flag | u(1) |
| gci_no_virtual_boundaries_constraint_flag | u(1) |
| ... | |
| gci_no_virtual_boundaries_constraint_flag | u(1) |
| ~~gci_num_reserved_bits~~ | ~~u(8)~~ |
| gci_num_additional_bits | u(8) |
| if( gci_num_additional_bits > 0 ) { | |
| gci_all_rap_pictures_constraint_flag | u(1) |
| gci_no_extended_precision_processing_constraint_flag | u(1) |
| gci_no_ts_residual_coding_rice_constraint_flag | u(1) |
| gci_no_rrc_rice_extension_constraint_flag | u(1) |
| gci_no_persistent_rice_adaptation_constraint_flag | u(1) |
| gci_no_reverse_last_sig_coeff_constraint_flag | u(1) |

-continued

| | Descriptor |
|---|---|
|     <u>numAdditionalBitsUsed = 6</u> | |
| <u>} else</u> | |
|     <u>numAdditionalBitsUsed = 0</u> | |
|     <u>for( i = 0; i < gci_num_additional_bits −numAdditionalBitsUsed; i++ )</u> | |
|    ~~for( i = 0; i < gci_num_reserved_bits; i++ )~~ | |
|       gci_reserved_zero_bit[ i ] | u(1) |
|  } | |
|  while( !byte_aligned( ) ) | |
|    gci_alignment_zero_bit | f(1) |
| } | |

For simplicity, all syntax elements in the updated GCI syntax strucutre, excluding gci_present_flag, gci_num_additional_bits, gci_reserved_zero_bit[i], and gci_alignment_zero_bit, are referred to as the GCI syntax elements.

The changes to the semantics of the GCI syntax structures are as follows:

. . .

gci_num_additional_bits specifies the number of the additional GCI bits in the general constraints information syntax structure other than gci_alignment_zero_bit syntax elements (when present). The value of gci_num_additional_bits shall be equal to 0 or 1 in bitstreams conforming to this version of this document. Values greater than 1 for gci_num_additional_bits are reserved for future use by ITU-T|ISO/IEC. Although the value of gci_num_additional_bits is required to be equal to 0 or 1 in this version of this document, decoders conforming to this version of this document shall allow values of gci_num_additional_bits greater than 1 to appear in the syntax and shall ignore the values of all the gci_reserved_zero_bit[i] syntax elements when gci_num_additional_bits is greater than 1.

gci_all_rap_pictures_constraint_flag equal to 1 specifies that all pictures in OlsInScope are GDR pictures with ph_recovery_poc_ent equal to 0 or IRAP pictures. gci_all_rap_pictures_constraint_flag equal to 0 does not impose such a constraint.

gci_no_extended_precision_processing_constraint_flag equal 1 to 1 specifies that sps_extended_precision_flag for all pictures in OlsInScope shall be equal to 0. gci_no_extended_precision_processing_constraint_ flag equal to 0 does not impose such a constraint.

gci_no_ts_residual_coding_rice_constraint_flag equal to 1 specifies that sps_ts_residual_coding rice present in sh flag for all pictures in OlsInScope shall be equal to 0. gci_no_ts_residual_coding_rice_constraint_flag equal to 0 does not impose such a constraint.

gci_no_rre_rice_extension_constraint_flag equal to 1 specifies that sps_rre_rice_extension_flag for all pictures in OlsInScope shall be equal to 0. gci_no_rre_rice_extension_constraint_flag equal to 0 does not impose such a constraint.

gci_no_persistent_rice_adaptation_constraint_flag equal to 1 specifies that sps_persistent_rice_adaptation_enabled_flag for all pictures in OlsInScope shall be equal to 0. gci_no_persistent_rice_adaptation_constraint_ flag equal to 0 does not impose such a constraint.

gci_no_reverse_last_sig_coeff_constraint_flag equal to 1 specifies that sps_reverse_last_sig_coeff_enabled_flag for all pictures in OlsInScope shall be equal to 0. gci_no_reverse_last_sig_coeff_constraint_flag equal to 0 does not impose such a constraint.

. . .

3. PROBLEMS

When gci_present_flag is equal to 0, no GCI syntax elements exist, including the new range extensions GCI flags. In that case, the general_constraint_info( ) syntax structure does not impose any constraint. However, when gci_present_flag is equal to 1, although all the GCI syntax elements specified in VVC edition 1 are surely present, the new range extensions GCI flags may or may not be present, depending on whether gci_num_additional_bits (which was gci_num_reserved_bits in VVC edition 1) is greater than 0.

A problem arises when gci_present_flag is equal to 1 and gci_num_additional_bits is equal to 0, in which case the new range extensions GCI flags are not present while their values are not inferred, and thus it is unclear whether the constraints specified by the flags equal to 1 apply or not.

4. DETAILED SOLUTIONS

To solve the above problem, methods as summarized below are disclosed. The solutions should be considered as examples to explain the general concepts and should not be interpreted in a narrow way. Furthermore, these solutions can be applied individually or combined in any manner.

1) In one example, the value of each of the six new VVC range extensions GCI flags (listed below) is inferred to be equal to 0 when gci_present_flag is equal to 1 and gci_num_additional_bits is equal to 0:
  a. gci_all_rap_pictures_constraint_flag
  b. gci_no_extended_precision_processing_constraint_ flag
  c. gci_no_ts_residual_coding_rice_constraint_flag
  d. gci_no_rrc_rice_extension_constraint_flag
  e. gci_no_persistent_rice_adaptation_constraint_flag
  f. gci_no_reverse_last_sig_coeff_constraint_flag 2) Alternatively, in another example, the value of each of the six new VVC range extensions GCI flags is inferred to be equal to 0 whenever it is not present.

3) Alternatively, in yet another example, the value of each of all GCI syntax elements, including those specified in VVC edition 1 and the six new VVC range extensions GCI flags, is inferred to be equal to 0 whenever it is not present.

5. EMBODIMENTS

Below are some example embodiments for all of the solution aspects summarized above in Section 4. These embodiments can be applied to VVC. Changes are highlighted, wherein additions are underlined, and deleted parts are shown in strike through.

17
5.1. Embodiment 1

This embodiment corresponds to item 1 in Section 4.

The semantics of the GCI syntax structure is as follows:

All syntax elements in the GCI syntax strucutre, excluding gci_present_flag, gci_num_additional_bits, gci_reserved_zero_bit[i], and gci_alignment_zero_bit, are referred to as the GCI syntax elements.

gci_present_flag equal to 1 specifies that GCI syntax elements starting from gci_intra_only_constraint_flag to gci_no_virtual_boundaries_constraint_flag, inclusive, are present in the general_constraints_info( ) syntax structure. gci_present_flag equal to 0 specifies that GCI syntax elements are not present in the general_constraints_info( ) syntax structure.

The semantics of the GCI syntax elements starting from gci_intra_only_constraint_flag to gci_no_virtual_boundaries_constraint_flag, inclusive, specified in this clause apply when gci_present_flag is equal to 1. When gci_present_flag is equal to 0, the general_constraint_info( ) syntax structure does not impose any constraint.

gci_intra_only_constraint_flag equal to 1 specifies that sh_slice_type for all slices in OlsInScope shall be equal to 2. gci_intra_only_constraint_flag equal to 0 does not impose such a constraint.

. . .

gci_sixteen_minus_max_bitdepth_constraint_idc greater than 0 specifies that sps_bitdepth_minus8 plus 8 for all pictures in OlsInScope shall be in the range of 0 to 16-gci_sixteen_minus_max_bitdepth_constraint_idc, inclusive. gci_sixteen_minus_max_bitdepth_constraint_idc equal to 0 does not impose such a constraint. The value of gci_sixteen_minus_max_bitdepth_constraint_idc shall be in the range of 0 to 8, inclusive.

gci_three_minus_max_chroma_format_constraint_idc greater than 0 specifies that sps_chroma_format_idc for all pictures in OlsInScope shall be in the range of 0 to 3-gci_three_minus_max_chroma_format_constraint_idc, inclusive. gci_three_minus_max_chroma_format_constraint_idc equal to 0 does not impose such a constraint.

. . .

gci_num_additional_bits specifies the number of the additional GCI bits in the general constraints information syntax structure other than gci_alignment_zero_bit syntax elements (when present). The value of gci_num_additional_bits shall be equal to 0 or 1 in bitstreams conforming to this version of this document. Values greater than 1 for gci_num_additional_bits are reserved for future use by ITU-T|ISO/IEC. Although the value of gci_num_additional_bits is required to be equal to 0 or 1 in this version of this document, decoders conforming to this version of this document shall allow values of gci_num_additional_bits greater than 1 to appear in the syntax and shall ignore the values of all the gci_reserved_zero_bit[i] syntax elements when gci_num_additional_bits is greater than 1.

gci_all_rap_pictures_constraint_flag equal to 1 specifies that all pictures in OlsInScope are GDR pictures with ph_recovery_poc_ent equal to 0 or IRAP pictures. gci_all_rap_pictures_constraint_flag equal to 0 does not impose such a constraint. When gci_present_flag is equal to 1 and gci_num_additional_bits is equal to 0, the value of gci_all_rap_pictures_constraint_flag is inferred to be equal to 0.
gci_no_extended_precision_processing_constraint_flag equal to 1 specifies that sps_extended_precision_flag for all pictures in OlsInScope shall be equal to 0. gci_no_extended_precision_processing_constraint_flag equal to 0 does not impose such a constraint. When gci_present_flag is equal to 1 and gci_num_additional_bits is equal to 0, the value of gci_no_extended_precision_processing_constraint_flag is inferred to be equal to 0.

gci_no_ts_residual_coding_rice_constraint_flag equal to 1 specifies that sps_ts_residual_coding_rice_present_in_sh_flag for all pictures in OlsInScope shall be equal to 0. gci_no_ts_residual_coding_rice_constraint_flag equal to 0 does not impose such a constraint. When gci_present_flag is equal to 1 and gci_num_additional_bits is equal to 0, the value of gci_no_ts_residual_coding_rice_constraint_flag is inferred to be equal to 0.

gci_no_rrc_rice_extension_constraint_flag equal to 1 specifies that sps_rre_rice_extension_flag for all pictures in OlsInScope shall be equal to 0. gci_no_rrc_rice_extension_constraint_flag equal to 0 does not impose such a constraint. When gci_present_flag is equal to 1 and gci_num_additional_bits is equal to 0, the value of gci_no_rre_rice_extension_constraint_flag is inferred to be equal to 0.

gci_no_persistent_rice_adaptation_constraint_flag equal to 1 specifies that sps_persistent_rice_adaptation_enabled_flag for all pictures in OlsInScope shall be equal to 0. gci_no_persistent_rice_adaptation_constraint_flag equal to 0 does not impose such a constraint. When gci_present_flag is equal to 1 and gci_num_additional_bits is equal to 0, the value of gci_no_persistent_rice_adaptation_constraint_flag is inferred to be equal to 0.

gci_no_reverse_last_sig_coeff_constraint_flag equal to 1 specifies that sps_reverse_last_sig_coeff_enabled_flag for all pictures in OlsInScope shall be equal to 0. gci_no_reverse_last_sig_coeff_constraint_flag equal to 0 does not impose such a constraint. When gci_present_flag is equal to 1 and gci_num_additional_bits is equal to 0, the value of gci_no_reverse_last_sig_coeff_constraint_flag is inferred to be equal to 0.

. . .

5.2. Embodiment 2

This embodiment corresponds to item 2 in Section 4.

The semantics of the GCI syntax structure is as follows:

All syntax elements in the GCI syntax strucutre, excluding gci_present_flag, gci_num_additional_bits, gci_reserved_zero_bit[i], and gci_alignment_zero_bit, are referred to as the GCI syntax elements.

gci_present_flag equal to 1 specifies that GCI syntax elements starting from gci_intra_only_constraint_flag to gci_no_virtual_boundaries_constraint_flag, inclusive, are present in the general_constraints_info( ) syntax structure. gci_present_flag equal to 0 specifies that GCI syntax elements are not present in the general_constraints_info( ) syntax structure.

The semantics of the GCI syntax elements starting from gci_intra_only_constraint_flag to gci_no_virtual_boundaries_constraint_flag, inclusive, specified in this clause apply when gci_present_flag is equal to 1. When gci_present_flag is equal to 0, the general_constraint_info( ) syntax structure does not impose any constraint.

gci_intra_only_constraint_flag equal to 1 specifies that sh_slice_type for all slices in OlsInScope shall be equal to 2. gci_intra_only_constraint_flag equal to 0 does not impose such a constraint.

. . .

gci_sixteen_minus_max_bitdepth_constraint_idc greater than 0 specifies that sps_bitdepth_minus8 plus 8 for all pictures in OlsInScope shall be in the range of 0 to 16-gci_sixteen_minus_max_bitdepth_constraint_idc, inclusive. gci_sixteen_minus_max_bitdepth_constraint_idc equal to 0 does not impose such a constraint. The value of gci_sixteen_minus_max_bitdepth_constraint_idc shall be in the range of 0 to 8, inclusive.

gci_three_minus_max_chroma_format_constraint_idc greater than 0 specifies that sps_chroma_format_idc for all pictures in OlsInScope shall be in the range of 0 to 3-gci_three_minus_max_chroma_format_constraint_idc, inclusive. gci_three_minus_max_chroma_format_constraint_idc equal to 0 does not impose such a constraint.

. . .

gci_num_additional_bits specifies the number of the additional GCI bits in the general constraints information syntax structure other than gci_alignment_zero_bit syntax elements (when present). The value of gci_num_additional_bits shall be equal to 0 or 1 in bitstreams conforming to this version of this document. Values greater than 1 for gci_num_additional_bits are reserved for future use by ITU-T|ISO/IEC. Although the value of gci_num_additional_bits is required to be equal to 0 or 1 in this version of this document, decoders conforming to this version of this document shall allow values of gci_num_additional_bits greater than 1 to appear in the syntax and shall ignore the values of all the gci_reserved_zero_bit[i] syntax elements when gci_num_additional_bits is greater than 1.

gci_all_rap_pictures_constraint_flag equal to 1 specifies that all pictures in OlsInScope are GDR pictures with ph_recovery_poc_ent equal to 0 or IRAP pictures. gci_all_rap_pictures_constraint_flag equal to 0 does not impose such a constraint. When not present, the value of gci_all_rap_pictures_constraint_flag is inferred to be equal to 0.

gci_no_extended_precision_processing_constraint_flag equal to 1 specifies that sps_extended_precision_flag for all pictures in OlsInScope shall be equal to 0. gci_no_extended_precision_processing_constraint_flag equal to 0 does not impose such a constraint. When not present, the value of gci_no_extended_precision_processing_constraint_flag is inferred to be equal to 0.

gci_no_ts_residual_coding_rice_constraint_flag equal to 1 specifies that sps_ts_residual_coding_rice_present_in_sh_flag for all pictures in OlsInScope shall be equal to 0. gci_no_ts_residual_coding_rice_constraint_ flag equal to 0 does not impose such a constraint. When not present, the value of gci_no_ts_residual_coding_rice_constraint_flag is inferred to be equal to 0.

gci_no_rrc_rice_extension_constraint_flag equal to 1 specifies that sps_rrc_rice_extension_flag for all pictures in OlsInScope shall be equal to 0. gci_no_rrc_rice_extension_constraint_flag equal to 0 does not impose such a constraint. When not present, the value of gci_no_rrc_rice_extension_constraint_flag is inferred to be equal to 0.

gci_no_persistent_rice_adaptation_constraint_flag equal to 1 specifies that sps_persistent_rice_adaptation_enabled_flag for all pictures in OlsInScope shall be equal to 0. gci_no_persistent_rice_adaptation_constraint_flag equal to 0 does not impose such a constraint. When not present, the value of gci_no_persistent_rice_adaptation_constraint_flag is inferred to be equal to 0.

gci_no_reverse_last_sig_coeff_constraint_flag equal to 1 specifies that sps_reverse_last_sig_coeff_enabled_flag for all pictures in OlsInScope shall be equal to 0. gci_no_reverse_last_sig_coeff_constraint_flag equal to 0 does not impose such a constraint. When not present, the value of gci_no_reverse_last_sig_coeff_constraint_flag is inferred to be equal to 0.

. . .

5.3. Embodiment 3

This embodiment corresponds to item 3 in Section 4.

The semantics of the GCI syntax structure is as follows:

All syntax elements in the GCI syntax strucutre, excluding gci_present_flag, gci_num_additional_bits, gci_reserved_zero_bit[i], and gci_alignment_zero_bit, are referred to as the GCI syntax elements.

When any of the GCI syntax element is not present, the value of that GCI syntax element is inferred to be equal to 0.

gci_present_flag equal to 1 specifies that the GCI syntax elements starting from gci_intra_only_constraint_flag to gci_no_virtual_boundaries_constraint_flag, inclusive, are present in the general_constraints_info( ) syntax structure. gci_present_flag equal to 0 specifies that the GCI syntax elements are not present in the general_constraints_info( ) syntax structure.

The semantics of the GCI syntax elements specified in this clause apply when gci_present_flag is equal to 1. When gci_present_flag is equal to 0, the general_constraint_info( ) syntax structure does not impose any constraint.

gci_intra_only_constraint_flag equal to 1 specifies that sh_slice_type for all slices in OlsInScope shall be equal to 2. gci_intra_only_constraint_flag equal to 0 does not impose such a constraint.

. . .

gci_sixteen_minus_max_bitdepth_constraint_idc greater than 0 specifies that sps_bitdepth_minus8 plus 8 for all pictures in OlsInScope shall be in the range of 0 to 16-gci_sixteen_minus_max_bitdepth_constraint_idc, inclusive. gci_sixteen_minus_max_bitdepth_constraint_idc equal to 0 does not impose such a constraint. The value of gci_sixteen_minus_max_bitdepth_constraint_idc shall be in the range of 0 to 8, inclusive.

gci_three_minus_max_chroma_format_constraint_idc greater than 0 specifies that sps_chroma_format_idc for all pictures in OlsInScope shall be in the range of 0 to 3-gci_three_minus_max_chroma_format_constraint_idc, inclusive. gci_three_minus_max_chroma_format_constraint_idc equal to 0 does not impose such a constraint.

. . .

gci_num_additional_bits specifies the number of the additional GCI bits in the general constraints information syntax structure other than gci_alignment_zero_bit syntax elements (when present). The value of gci_num_additional_bits shall be equal to 0 or 1 in bitstreams conforming to this version of this document. Values greater than 1 for gci_num_additional_bits are reserved for future use by ITU-T|ISO/IEC. Although the value of gci_num_additional_bits is required to be equal to 0 or 1 in this version of this document, decoders conforming to this version of this document shall allow values of gci_num_additional_bits greater than 1 to appear in the syntax and shall ignore the values of all the gci_reserved_zero_bit[i] syntax elements when gci_num_additional_bits is greater than 1.

gci_all_rap_pictures_constraint_flag equal to 1 specifies that all pictures in OlsInScope are GDR pictures with ph_recovery_poc_ent equal to 0 or IRAP pictures. gci_all_rap_pictures_constraint_flag equal to 0 does not impose such a constraint.

gci_no_extended_precision_processing_constraint_flag equal to 1 specifies that sps_extended_precision_flag for all pictures in OlsInScope shall be equal to 0. gci_no_extended_precision_processing_constraint_flag equal to 0 does not impose such a constraint.

gci_no_ts_residual_coding_rice_constraint_flag equal to 1 specifies that sps_ts_residual_coding_rice_present_in_sh_flag for all pictures in OlsInScope shall be equal to 0. gci_no_ts_residual_coding_rice_constraint_ flag equal to 0 does not impose such a constraint.

gci_no_rrc_rice_extension_constraint_flag equal to 1 specifies that sps_rrc_rice_extension_flag for all pictures in OlsInScope shall be equal to 0. gci_no_rrc_rice_extension_constraint_flag equal to 0 does not impose such a constraint.

gci_no_persistent_rice_adaptation_constraint_flag equal to specifies that 1 sps_persistent_rice_adaptation_enabled_flag for all pictures in OlsInScope shall be equal to 0. gci_no_persistent_rice_adaptation_constraint_ flag equal to 0 does not impose such a constraint.

gci_no_reverse_last_sig_coeff_constraint_flag equal to 1 specifies that sps_reverse_last_sig_coeff_enabled_flag for all pictures in OlsInScope shall be equal to 0. gci_no_reverse_last_sig_coeff_constraint_flag equal to 0 does not impose such a constraint.

. . .

The embodiments of the present disclosure are related to signaling of VVC range extensions general constraints information flags.

FIG. 4 illustrates a flowchart of a method 400 for video processing in accordance with some embodiments of the present disclosure. As shown in FIG. 4, at 402, a conversion between a current video block of a video and a bitstream of the video is performed based on general constraints information (GCI) for the video. As used herein, the term "block" may represent a coding tree block (CTB), a coding tree unit (CTU), a coding block (CB), a coding unit (CU), a prediction unit (PU), a transform unit (TU), a prediction block (PB), a transform block (TB), a video processing unit comprising multiple samples/pixels, and/or the like. A block may be rectangular or non-rectangular. In some embodiments, the conversion may include encoding the current video block into the bitstream. Additionally or alternatively, the conversion may include decoding the current video block from the bitstream.

The GCI indicates specific constraint properties of the bitstream. The GCI comprises one or more syntax elements from the following syntax elements: (1) a first syntax element indicating whether all pictures in one or more output layer sets (OLSs) are recovery point pictures or intra random access point (IRAP) pictures, (2) a second syntax element indicating whether, for all pictures in one or more OLSs, an extended dynamic range is used in scaling and transformation processes and for a binarization of syntax elements abs_remaining and dec_abs_level, (3) a third syntax element indicating whether, for all pictures in one or more OLSs, a Rice parameter used for a syntax structure residual_ts_coding in a current slice is indicated in syntax structures slice_header referring to a sequence parameter set (SPS), (4) a fourth syntax element indicating whether, for all pictures in one or more OLSs, an alternative Rice parameter derivation is used for the binarization of syntax elements abs_remaining and dec_abs_level, (5) a fifth syntax element indicating whether, for all pictures in one or more OLSs, a Rice parameter derivation for the binarization of syntax elements abs_remaining and dec_abs_level is initialized at the start of each transform unit (TU) using statistics accumulated from previous TUs, or (6) a sixth syntax element indicating whether, for all pictures in one or more OLSs, a syntax element sh_reverse_last_sig_coeff_flag is present in syntax structures slice_header referring to the SPS. Each of the above mentioned one or more syntax elements is absent from the bitstream and has a value equal to a first predetermined value. In one example, the first predetermined value may be equal to 0. It should be understood that the first predetermined value may be any other suitable value, such as 1. The scope of the present disclosure is not limited in this respect.

In some embodiments, the first syntax element may be a syntax element gci_all_rap_pictures_constraint_flag, the second syntax element may be a syntax element gci_no_extended_precision_processing_constraint_flag, the third syntax element may be a syntax element gci_no_ts_residual_coding_rice_constraint_flag, the fourth syntax element may be a syntax element gci_no_rrc_rice_extension_constraint_flag, the fifth syntax element may be a syntax element gci_no_persistent_rice_adaptation_constraint_flag, and the sixth syntax element may be a syntax element gci_no_reverse_last_sig_coeff_constraint_flag. By way of example, if the syntax element gci_all_rap_pictures_constraint_flag is not present in the bitstream, it's value may be inferred to be 0.

In view of the above, the value of each of the six GCI syntax elements is inferred to be equal to a predetermined value (e.g., 0), if it is not present in the bitstream. Compared with the conventional solution where the values of these GCI syntax elements are not inferred, the proposed method can obtain the values of these GCI syntax elements when they are absent from the bitstream, and thus can advantageously ensure a uniform process for video processing and improve the coding efficiency.

In some embodiments, the GCI may further comprise a seventh syntax element and an eighth syntax element. The seventh syntax element may indicate whether GCI syntax elements are present in a syntax structure for the GCI. The seventh syntax element may have a value equal to a second predetermined value. The eighth syntax element may indicate the number of additional GCI bits in the syntax structure other than syntax elements gci_alignment_zero_bit. The eighth syntax element may have a value equal to a third predetermined value. In one example, the seventh syntax element may be a syntax element gci_present_flag, and the eighth syntax element may be a syntax element gci_num_additional_bits. Furthermore, the second predetermined value may be 1, and the third predetermined value may be 0. It should be understood that the second and third predetermined values may be any other suitable value. The scope of the present disclosure is not limited in this respect.

Alternatively, or in addition, the GCI may further comprise a ninth syntax element different from the first, second, third, fourth, fifth and sixth syntax elements. The ninth syntax element may be absent from the bitstream and may have a value equal to the first predetermined value. For example, the ninth syntax element may be one of GCI syntax elements specified in VVC edition 1, such as a syntax element gci_intra_only_constraint_flag, a syntax element gci_no_virtual_boundaries_constraint_flag. If the syntax element gci_intra_only_constraint_flag is not present in the bitstream, it's value may be inferred to be 0. It should be understood that the above illustrations and/or examples are described merely for purpose of description. The scope of the present disclosure is not limited in this respect.

According to embodiments of the present disclosure, a non-transitory computer-readable recording medium is proposed. A bitstream of a video is stored in the non-transitory computer-readable recording medium. The bitstream can be generated by a method performed by a video processing apparatus. According to the method, a conversion between a current video block of a video and a bitstream of the video is performed based on general constraints information (GCI) for the video. The GCI comprises one or more syntax elements from the following syntax elements: a first syntax element indicating whether all pictures in one or more output layer sets (OLSs) are recovery point pictures or intra random access point (IRAP) pictures, a second syntax element indicating whether, for all pictures in one or more OLSs, an extended dynamic range is used in scaling and transformation processes and for a binarization of syntax elements abs_remaining and dec_abs_level, a third syntax element indicating whether, for all pictures in one or more OLSs, a Rice parameter used for a syntax structure residu-al_ts_coding in a current slice is indicated in syntax structures slice_header referring to a sequence parameter set (SPS), a fourth syntax element indicating whether, for all pictures in one or more OLSs, an alternative Rice parameter derivation is used for the binarization of syntax elements abs_remaining and dec_abs_level, a fifth syntax element indicating whether, for all pictures in one or more OLSs, a Rice parameter derivation for the binarization of syntax elements abs_remaining and dec_abs_level is initialized at the start of each transform unit (TU) using statistics accu-mulated from previous TUs, or a sixth syntax element indicating whether, for all pictures in one or more OLSs, a syntax element sh_reverse_last_sig_coeff_flag is present in syntax structures slice_header referring to the SPS. Each of the one or more syntax elements is absent from the bitstream and has a value equal to a first predetermined value.

According to embodiments of the present disclosure, a method for storing a bitstream of a video is proposed. In the method, a conversion between a current video block of a video and a bitstream of the video is performed based on general constraints information (GCI) for the video, and the bitstream is stored in a non-transitory computer-readable recording medium. The GCI comprises one or more syntax elements from the following syntax elements: a first syntax element indicating whether all pictures in one or more output layer sets (OLSs) are recovery point pictures or intra random access point (IRAP) pictures, a second syntax element indicating whether, for all pictures in one or more OLSs, an extended dynamic range is used in scaling and transformation processes and for a binarization of syntax elements abs_remaining and dec_abs_level, a third syntax element indicating whether, for all pictures in one or more OLSs, a Rice parameter used for a syntax structure residu-al_ts_coding in a current slice is indicated in syntax structures slice_header referring to a sequence parameter set (SPS), a fourth syntax element indicating whether, for all pictures in one or more OLSs, an alternative Rice parameter derivation is used for the binarization of syntax elements abs_remaining and dec_abs_level, a fifth syntax element indicating whether, for all pictures in one or more OLSs, a Rice parameter derivation for the binarization of syntax elements abs_remaining and dec_abs_level is initialized at the start of each transform unit (TU) using statistics accu-mulated from previous TUs, or a sixth syntax element indicating whether, for all pictures in one or more OLSs, a syntax element sh_reverse_last_sig_coeff_flag is present in syntax structures slice_header referring to the SPS. Each of the one or more syntax elements is absent from the bitstream and has a value equal to a first predetermined value.

Implementations of the present disclosure can be described in view of the following clauses, the features of which can be combined in any reasonable manner.

Clause 1. A method for video processing, comprising: performing a conversion between a current video block of a video and a bitstream of the video based on general con-straints information (GCI) for the video, the GCI comprising one or more syntax elements from the following syntax elements: a first syntax element indicating whether all pictures in one or more output layer sets (OLSs) are recovery point pictures or intra random access point (IRAP) pictures, a second syntax element indicating whether, for all pictures in one or more OLSs, an extended dynamic range is used in scaling and transformation processes and for a binarization of syntax elements abs_remaining and dec_abs_level, a third syntax element indicating whether, for all pictures in one or more OLSs, a Rice parameter used for a syntax structure residual_ts_coding in a current slice is indicated in syntax structures slice_header referring to a sequence parameter set (SPS), a fourth syntax element indicating whether, for all pictures in one or more OLSs, an alternative Rice parameter derivation is used for the binarization of syntax elements abs_remaining and dec_abs_level, a fifth syntax element indicating whether, for all pictures in one or more OLSs, a Rice parameter derivation for the binarization of syntax elements abs_remaining and dec_abs_level is initialized at the start of each transform unit (TU) using statistics accu-mulated from previous TUs, or a sixth syntax element indicating whether, for all pictures in one or more OLSs, a syntax element sh_reverse_last_sig_coeff_flag is present in syntax structures slice_header referring to the SPS, wherein each of the one or more syntax elements is absent from the bitstream and has a value equal to a first predetermined value.

Clause 2. The method of clause 1, wherein the first predetermined value is 0.

Clause 3. The method of any of clauses 1-2, wherein the first syntax element is a syntax element gci_all_rap_pic-tures_constraint_flag, the second syntax element is a syntax element gci_no_extended_precision_processing_con-straint_ flag, the third syntax element is a syntax element gci_no_ts_residual_coding_rice_constraint_flag, the fourth syntax element is a syntax element gci_no_rrc_rice_exten-sion_constraint_flag, the fifth syntax element is a syntax element gci_no_persistent_rice_adaptation_constraint_flag, and the sixth syntax element is a syntax element gci_no_r-everse_last_sig_coeff_constraint_flag.

Clause 4. The method of any of clauses 1-3, wherein the GCI further comprise a seventh syntax element and an eighth syntax element, the seventh syntax element indicates whether GCI syntax elements are present in a syntax struc-ture for the GCI, the eighth syntax element indicates the number of additional GCI bits in the syntax structure other than syntax elements gci_alignment_zero_bit, the seventh syntax element has a value equal to a second predetermined value and the eighth syntax element has a value equal to a third predetermined value.

Clause 5. The method of clause 4, wherein the seventh syntax element is a syntax element gci_present_flag, the eighth syntax element is a syntax element gci_num_additional_bits, the second predetermined value is 1, and the third predetermined value is 0.

Clause 6. The method of any of clauses 1-3, wherein the GCI further comprises a ninth syntax element different from the first, second, third, fourth, fifth and sixth syntax elements, the ninth syntax element is absent from the bitstream and has a value equal to the first predetermined value.

Clause 7. The method of any of clauses 1-6, wherein the conversion includes encoding the current video block into the bitstream.

Clause 8. The method of any of clauses 1-6, wherein the conversion includes decoding the current video block from the bitstream.

Clause 9. An apparatus for processing video data comprising a processor and a non-transitory memory with instructions thereon, wherein the instructions upon execution by the processor, cause the processor to perform a method in accordance with any of clauses 1-8.

Clause 10. A non-transitory computer-readable storage medium storing instructions that cause a processor to perform a method in accordance with any of clauses 1-8.

Clause 11. A non-transitory computer-readable recording medium storing a bitstream of a video which is generated by a method performed by a video processing apparatus, wherein the method comprises: performing a conversion between a current video block of a video and a bitstream of the video based on general constraints information (GCI) for the video, the GCI comprising one or more syntax elements from the following syntax elements: a first syntax element indicating whether all pictures in one or more output layer sets (OLSs) are recovery point pictures or intra random access point (IRAP) pictures, a second syntax element indicating whether, for all pictures in one or more OLSs, an extended dynamic range is used in scaling and transformation processes and for a binarization of syntax elements abs_remaining and dec_abs_level, a third syntax element indicating whether, for all pictures in one or more OLSs, a Rice parameter used for a syntax structure residual_ts_coding in a current slice is indicated in syntax structures slice_header referring to a sequence parameter set (SPS), a fourth syntax element indicating whether, for all pictures in one or more OLSs, an alternative Rice parameter derivation is used for the binarization of syntax elements abs_remaining and dec_abs_level, a fifth syntax element indicating whether, for all pictures in one or more OLSs, a Rice parameter derivation for the binarization of syntax elements abs_remaining and dec_abs_level is initialized at the start of each transform unit (TU) using statistics accumulated from previous TUs, or a sixth syntax element indicating whether, for all pictures in one or more OLSs, a syntax element sh_reverse_last_sig_coeff_flag is present in syntax structures slice_header referring to the SPS, wherein each of the one or more syntax elements is absent from the bitstream and has a value equal to a first predetermined value.

Clause 12. A method for storing a bitstream of a video, comprising: performing a conversion between a current video block of a video and a bitstream of the video based on general constraints information (GCI) for the video, the GCI comprising one or more syntax elements from the following syntax elements: a first syntax element indicating whether all pictures in one or more output layer sets (OLSs) are recovery point pictures or intra random access point (IRAP) pictures, a second syntax element indicating whether, for all pictures in one or more OLSs, an extended dynamic range is used in scaling and transformation processes and for a binarization of syntax elements abs_remaining and dec_abs_level, a third syntax element indicating whether, for all pictures in one or more OLSs, a Rice parameter used for a syntax structure residual_ts_coding in a current slice is indicated in syntax structures slice_header referring to a sequence parameter set (SPS), a fourth syntax element indicating whether, for all pictures in one or more OLSs, an alternative Rice parameter derivation is used for the binarization of syntax elements abs_remaining and dec_abs_level, a fifth syntax element indicating whether, for all pictures in one or more OLSs, a Rice parameter derivation for the binarization of syntax elements abs_remaining and dec_abs_level is initialized at the start of each transform unit (TU) using statistics accumulated from previous TUs, or a sixth syntax element indicating whether, for all pictures in one or more OLSs, a syntax element sh_reverse_last_sig_coeff_flag is present in syntax structures slice_header referring to the SPS; and storing the bitstream in a non-transitory computer-readable recording medium, wherein each of the one or more syntax elements is absent from the bitstream and has a value equal to a first predetermined value.

Example Device

Figure 5:
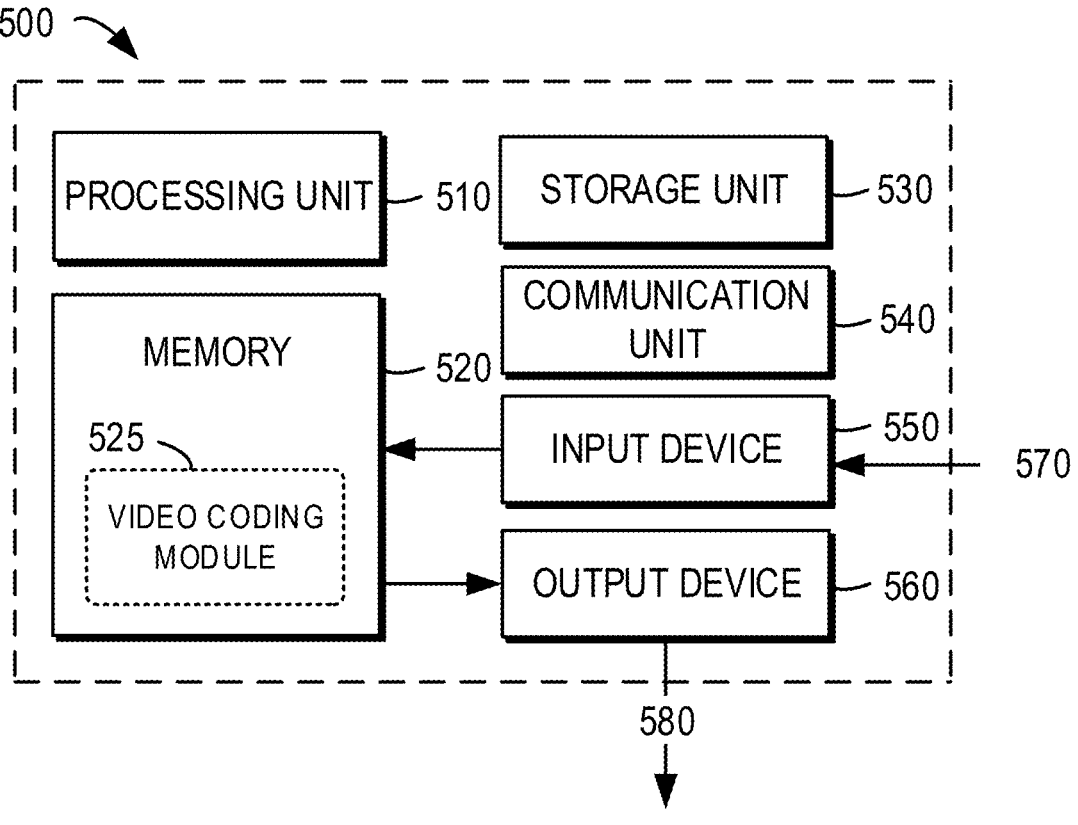
FIG. 5 illustrates a block diagram of a computing device in which various embodiments of the present disclosure can be implemented.

FIG. 5 illustrates a block diagram of a computing device 500 in which various embodiments of the present disclosure can be implemented. The computing device 500 may be implemented as or included in the source device 110 (or the video encoder 114 or 200) or the destination device 120 (or the video decoder 124 or 300).

It would be appreciated that the computing device 500 shown in FIG. 5 is merely for purpose of illustration, without suggesting any limitation to the functions and scopes of the embodiments of the present disclosure in any manner.

As shown in FIG. 5, the computing device 500 includes a general-purpose computing device 500. The computing device 500 may at least comprise one or more processors or processing units 510, a memory 520, a storage unit 530, one or more communication units 540, one or more input devices 550, and one or more output devices 560.

In some embodiments, the computing device 500 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 500 can support any type of interface to a user (such as "wearable" circuitry and the like).

The processing unit 510 may be a physical or virtual processor and can implement various processes based on programs stored in the memory 520. In a multi-processor system, multiple processing units execute computer executable instructions in parallel so as to improve the parallel processing capability of the computing device 500. The processing unit 510 may also be referred to as a central processing unit (CPU), a microprocessor, a controller or a microcontroller.

The computing device 500 typically includes various computer storage medium. Such medium can be any medium accessible by the computing device 500, including, but not limited to, volatile and non-volatile medium, or detachable and non-detachable medium. The memory 520 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 530 may be any detachable or non-detachable medium and may include a machine-readable medium such as a memory, flash memory drive, magnetic disk or another other media, which can be used for storing information and/or data and can be accessed in the computing device 500.

The computing device 500 may further include additional detachable/non-detachable, volatile/non-volatile memory medium. Although not shown in FIG. 5, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 540 communicates with a further computing device via the communication medium. In addition, the functions of the components in the computing device 500 can be implemented by a single computing cluster or multiple computing machines that can communicate via communication connections. Therefore, the computing device 500 can operate in a networked environment using a logical connection with one or more other servers, networked personal computers (PCs) or further general network nodes.

The input device 550 may be one or more of a variety of input devices, such as a mouse, keyboard, tracking ball, voice-input device, and the like. The output device 560 may be one or more of a variety of output devices, such as a display, loudspeaker, printer, and the like. By means of the communication unit 540, the computing device 500 can further communicate with one or more external devices (not shown) such as the storage devices and display device, with one or more devices enabling the user to interact with the computing device 500, or any devices (such as a network card, a modem and the like) enabling the computing device 500 to communicate with one or more other computing devices, if required. Such communication can be performed via input/output (I/O) interfaces (not shown).

In some embodiments, instead of being integrated in a single device, some or all components of the computing device 500 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 500 may be used to implement video encoding/decoding in embodiments of the present disclosure. The memory 520 may include one or more video coding modules 525 having one or more program instructions. These modules are accessible and executable by the processing unit 510 to perform the functionalities of the various embodiments described herein.

In the example embodiments of performing video encoding, the input device 550 may receive video data as an input 570 to be encoded. The video data may be processed, for example, by the video coding module 525, to generate an encoded bitstream. The encoded bitstream may be provided via the output device 560 as an output 580.

In the example embodiments of performing video decoding, the input device 550 may receive an encoded bitstream as the input 570. The encoded bitstream may be processed, for example, by the video coding module 525, to generate decoded video data. The decoded video data may be provided via the output device 560 as the output 580.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

I claim:

1. A method for video processing, comprising:

performing a conversion between a current video block of a video and a bitstream of the video based on general constraints information (GCI) for the video, the GCI comprising information indicated by one or more syntax elements from the following syntax elements:

a first syntax element indicating whether all pictures in one or more output layer sets (OLSs) are recovery point pictures or intra random access point (IRAP) pictures, a second syntax element indicating whether, for all pictures in one or more OLSs, an extended dynamic range is used in scaling and transformation processes and for a binarization of syntax elements abs_remaining and dec_abs_level, a third syntax element indicating whether, for all pictures in one or more OLSs, a Rice parameter used for a syntax structure residual_ts_coding in a current slice is indicated in syntax structures slice_header referring to a sequence parameter set (SPS), a fourth syntax element indicating whether, for all pictures in one or more OLSs, an alternative Rice parameter derivation is used for the binarization of syntax elements abs_remaining and dec_abs_level, a fifth syntax element indicating whether, for all pictures in one or more OLSs, a Rice parameter derivation for the binarization of syntax elements abs_remaining and dec_abs_level is initialized at the start of each transform unit (TU) using statistics accumulated from previous TUs, or a sixth syntax element indicating whether, for all pictures in one or more OLSs, a syntax element sh_reverse_last_sig_coeff_flag is present in syntax structures slice_header referring to the SPS, wherein if at least one syntax element of the one or more syntax elements is absent from the bitstream, a value of each of the at least one syntax element is equal to a first predetermined value.

2. The method of claim 1, wherein the first predetermined value is 0.

3. The method of claim 1, wherein the first syntax element is a syntax element gci_all_rap_pictures_constraint_flag, the second syntax element is a syntax element gci_no_extended_precision_processing_constraint_flag, the third syntax element is a syntax element gci_no_ts_residual_coding_rice_constraint_flag, the fourth syntax element is a syntax element gci_no_rrc_rice_extension_constraint_flag, the fifth syntax element is a syntax element gci_no_persistent_rice_adaptation_constraint_flag, and the sixth syntax element is a syntax element gci_no_reverse_last_sig_coeff_constraint_flag.

4. The method of claim 1, wherein the GCI further comprise information indicated by a seventh syntax element and an eighth syntax element, the seventh syntax element indicates whether GCI syntax elements are present in a syntax structure for the GCI, the eighth syntax element indicates the number of additional GCI bits in the syntax structure other than syntax elements gci_alignment_zero_bit, and if the seventh syntax element has a value equal to a second predetermined value and the eighth syntax element has a value equal to a third predetermined value, a value of each of the one or more syntax elements is equal to the first predetermined value.

5. The method of claim 4, wherein the seventh syntax element is a syntax element gci_present_flag, the eighth syntax element is a syntax element gci_num_additional_bits, the second predetermined value is 1, and the third predetermined value is 0.

6. The method of claim 1, wherein the GCI further comprises information indicated by a ninth syntax element different from the first, second, third, fourth, fifth and sixth syntax elements, and if the ninth syntax element is absent from the bitstream, a value of the ninth syntax element is equal to the first predetermined value.

7. The method of claim 1, wherein the conversion includes encoding the current video block into the bitstream.

8. The method of claim 1, wherein the conversion includes decoding the current video block from the bitstream.

9. An apparatus for processing video data comprising a processor and a non-transitory memory with instructions thereon, wherein the instructions upon execution by the processor, cause the processor to perform acts comprising:

performing a conversion between a current video block of a video and a bitstream of the video based on general constraints information (GCI) for the video, the GCI comprising information indicated by one or more syntax elements from the following syntax elements:

a first syntax element indicating whether all pictures in one or more output layer sets (OLSs) are recovery point pictures or intra random access point (IRAP) pictures, a second syntax element indicating whether, for all pictures in one or more OLSs, an extended dynamic range is used in scaling and transformation processes and for a binarization of syntax elements abs_remaining and dec_abs_level, a third syntax element indicating whether, for all pictures in one or more OLSs, a Rice parameter used for a syntax structure residual_ts_coding in a current slice is indicated in syntax structures slice_header referring to a sequence parameter set (SPS), a fourth syntax element indicating whether, for all pictures in one or more OLSs, an alternative Rice parameter derivation is used for the binarization of syntax elements abs_remaining and dec_abs_level, a fifth syntax element indicating whether, for all pictures in one or more OLSs, a Rice parameter derivation for the binarization of syntax elements abs_remaining and dec_abs_level is initialized at the start of each transform unit (TU) using statistics accumulated from previous TUs, or a sixth syntax element indicating whether, for all pictures in one or more OLSs, a syntax element sh_reverse_last_sig_coeff_flag is present in syntax structures slice_header referring to the SPS, wherein if at least one syntax element of the one or more syntax elements is absent from the bitstream, a value of each of the at least one syntax element is equal to a first predetermined value.

10. The apparatus of claim 9, wherein the first predetermined value is 0.

11. The apparatus of claim 9, wherein the first syntax element is a syntax element gci_all_rap_pictures_constraint_flag, the second syntax element is a syntax element gci_no_extended_precision_processing_constraint_flag, the third syntax element is a syntax element gci_no_ts_residual_coding_rice_constraint_flag, the fourth syntax element is a syntax element gci_no_rrc_rice_extension_constraint_flag, the fifth syntax element is a syntax element gci_no_persistent_rice_adaptation_constraint_flag, and the sixth syntax element is a syntax element gci_no_reverse_last_sig_coeff_constraint_flag.

12. The apparatus of claim 9, wherein the conversion includes encoding the current video block into the bitstream, or wherein the conversion includes decoding the current video block from the bitstream.

13. A non-transitory computer-readable storage medium storing instructions that cause a processor to perform acts comprising:

performing a conversion between a current video block of a video and a bitstream of the video based on general constraints information (GCI) for the video, the GCI comprising information indicated by one or more syntax elements from the following syntax elements:

a first syntax element indicating whether all pictures in one or more output layer sets (OLSs) are recovery point pictures or intra random access point (IRAP) pictures, a second syntax element indicating whether, for all pictures in one or more OLSs, an extended dynamic range is used in scaling and transformation processes and for a binarization of syntax elements abs_remaining and dec_abs_level, a third syntax element indicating whether, for all pictures in one or more OLSs, a Rice parameter used for a syntax structure residual_ts_coding in a current slice is indicated in syntax structures slice_header referring to a sequence parameter set (SPS), a fourth syntax element indicating whether, for all pictures in one or more OLSs, an alternative Rice parameter derivation is used for the binarization of syntax elements abs_remaining and dec_abs_level, a fifth syntax element indicating whether, for all pictures in one or more OLSs, a Rice parameter derivation for the binarization of syntax elements abs_remaining and dec_abs_level is initialized at the start of each transform unit (TU) using statistics accumulated from previous TUs, or a sixth syntax element indicating whether, for all pictures in one or more OLSs, a syntax element sh_reverse_last_sig_coeff_flag is present in syntax structures slice_header referring to the SPS, wherein if at least one syntax element of the one or more syntax elements is absent from the bitstream, a value of each of the at least one syntax element is equal to a first predetermined value.

14. The non-transitory computer-readable storage medium of claim 13, wherein the first predetermined value is 0.

15. The non-transitory computer-readable storage medium of claim 13, wherein the first syntax element is a syntax element gci_all_rap_pictures_constraint_flag, the second syntax element is a syntax element gci_no_extended_precision_processing_constraint_flag, the third syntax element is a syntax element gci_no_ts_residual_coding_rice_constraint_flag, the fourth syntax element is a syntax element gci_no_rrc_rice_extension_constraint_flag, the fifth syntax element is a syntax element gci_no_persistent_rice_adaptation_constraint_flag, and the sixth syntax element is a syntax element gci_no_reverse_last_sig_coeff_constraint_flag.

16. The non-transitory computer-readable storage medium of claim 13, wherein the conversion includes encoding the current video block into the bitstream, or wherein the conversion includes decoding the current video block from the bitstream.

17. A method for storing a bitstream of a video, comprising:

performing a conversion between a current video block of the video and the bitstream based on general constraints information (GCI) for the video; and storing the bitstream in a non-transitory computer-readable recording medium;

wherein the GCI comprises information indicated by one or more syntax elements from the following syntax elements:

a first syntax element indicating whether all pictures in one or more output layer sets (OLSs) are recovery point pictures or intra random access point (IRAP) pictures, a second syntax element indicating whether, for all pictures in one or more OLSs, an extended dynamic range is used in scaling and transformation processes and for a binarization of syntax elements abs_remaining and dec_abs_level, a third syntax element indicating whether, for all pictures in one or more OLSs, a Rice parameter used for a syntax structure residual_ts_coding in a current slice is indicated in syntax structures slice_header referring to a sequence parameter set (SPS), a fourth syntax element indicating whether, for all pictures in one or more OLSs, an alternative Rice parameter derivation is used for the binarization of syntax elements abs_remaining and dec_abs_level, a fifth syntax element indicating whether, for all pictures in one or more OLSs, a Rice parameter derivation for the binarization of syntax elements abs_remaining and dec_abs_level is initialized at the start of each transform unit (TU) using statistics accumulated from previous TUs, or a sixth syntax element indicating whether, for all pictures in one or more OLSs, a syntax element sh_reverse_last_sig_coeff_flag is present in syntax structures slice_header referring to the SPS, wherein if at least one syntax element of the one or more syntax elements is absent from the bitstream, a value of each of the at least one syntax element is equal to a first predetermined value.

18. The method of claim 17, wherein the first predetermined value is 0.

19. The method of claim 17, wherein the first syntax element is a syntax element gci_all_rap_pictures_constraint_flag, the second syntax element is a syntax element gci_no_extended_precision_processing_constraint_flag, the third syntax element is a syntax element gci_no_ts_residual_coding_rice_constraint_flag, the fourth syntax element is a syntax element gci_no_rrc_rice_extension_constraint_flag, the fifth syntax element is a syntax element gci_no_persistent_rice_adaptation_constraint_flag, and the sixth syntax element is a syntax element gci_no_reverse_last_sig_coeff_constraint_flag.

20. The method of claim 17, wherein the conversion includes encoding the current video block into the bitstream, or wherein the conversion includes decoding the current video block from the bitstream.

* * * * *